United States Patent
Koyama

(10) Patent No.: US 9,938,028 B2
(45) Date of Patent: Apr. 10, 2018

(54) STRETCH PACKAGING MACHINE

(71) Applicant: ISHIDA CO., LTD., Kyoto-shi, Kyoto (JP)

(72) Inventor: Kazuo Koyama, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 380 days.

(21) Appl. No.: 14/817,700

(22) Filed: Aug. 4, 2015

(65) Prior Publication Data
US 2016/0039552 A1 Feb. 11, 2016

(30) Foreign Application Priority Data
Aug. 6, 2014 (JP) .................. 2014-004189

(51) Int. Cl.
| | |
|---|---|
| B65B 11/54 | (2006.01) |
| B65B 11/20 | (2006.01) |
| B65B 41/04 | (2006.01) |
| B65B 45/00 | (2006.01) |
| B65B 49/08 | (2006.01) |
| B65B 51/16 | (2006.01) |
| B65B 61/26 | (2006.01) |
| B65B 35/20 | (2006.01) |
| B65B 61/06 | (2006.01) |
| B65B 61/28 | (2006.01) |
| G01G 19/40 | (2006.01) |

(52) U.S. Cl.
CPC .............. *B65B 11/54* (2013.01); *B65B 11/20* (2013.01); *B65B 35/205* (2013.01); *B65B 41/04* (2013.01); *B65B 45/00* (2013.01); *B65B 49/08* (2013.01); *B65B 51/16* (2013.01); *B65B 61/26* (2013.01); *B65B 61/06* (2013.01); *B65B 61/28* (2013.01); *G01G 19/40* (2013.01)

(58) Field of Classification Search
CPC ......... B65B 11/18; B65B 11/20; B65B 11/22; B65B 11/54
USPC .................................................. 53/556, 228
See application file for complete search history.

(56) References Cited

U.S. PATENT DOCUMENTS 3,486,293 A * 12/1969 Van De Bilt ........... B65B 41/16
  53/66
4,418,511 A * 12/1983 Collin ..................... B65B 11/52
  264/553

(Continued)

FOREIGN PATENT DOCUMENTS

| CA | 2303211 A1 * | 1/2000 | ............ B65B 11/54 |
| JP | 63272616 A * | 11/1988 | |

(Continued)

*Primary Examiner* — Stephen F Gerrity

(57) ABSTRACT

A stretch packaging machine is provided with a lift mechanism and a tray movement mechanism. The lift mechanism has a plurality of loading members on which a tray is loaded and which lift up the tray toward film such that the tray contacts the film sealing an opening at the top of the tray. The tray movement mechanism is configured to move the tray slidingly over the loading members of the lift mechanism to a predetermined position on the loading members. A frictional coefficient of at least first loading members is such that contact between the tray and the loading members disposed on the near side in the moving direction in which the tray is moved by the tray movement mechanism is smaller than the frictional coefficient of second loading members disposed on the far side in the moving direction.

4 Claims, 14 Drawing Sheets

(56) References Cited

U.S. PATENT DOCUMENTS

| | | | | |
|---|---|---|---|---|
| 4,709,531 A | * | 12/1987 | Denda | B65B 11/54 198/456 |
| 4,951,447 A | * | 8/1990 | Denda et al. | B65B 11/54 53/131.2 |
| 5,157,903 A | * | 10/1992 | Nakashima et al. | B65B 11/54 493/476 |
| 5,528,881 A | * | 6/1996 | Cappi et al. | B65B 11/54 53/441 |
| 5,855,106 A | * | 1/1999 | Koyama et al. | B65B 11/54 53/168 |
| 6,189,302 B1 | * | 2/2001 | Kudo et al. | B65B 11/54 294/902 |
| 6,666,005 B1 | * | 12/2003 | Ohshita et al. | B65B 7/164 53/329.3 |
| 2001/0027632 A1 | * | 10/2001 | Whitby et al. | B65B 11/54 53/389.2 |
| 2006/0272283 A1 | * | 12/2006 | Kawanishi et al. | B65B 11/54 53/51 |
| 2008/0098694 A1 | * | 5/2008 | Brioschi | B65B 7/025 53/285 |

FOREIGN PATENT DOCUMENTS

| | | | | |
|---|---|---|---|---|
| JP | 05270522 A | * | 10/1993 | |
| JP | 09030507 A | * | 2/1997 | |
| JP | 2001146202 A | * | 5/2001 | |
| JP | 2002120808 A | * | 4/2002 | |
| JP | 2004-262514 A | | 9/2004 | |

\* cited by examiner

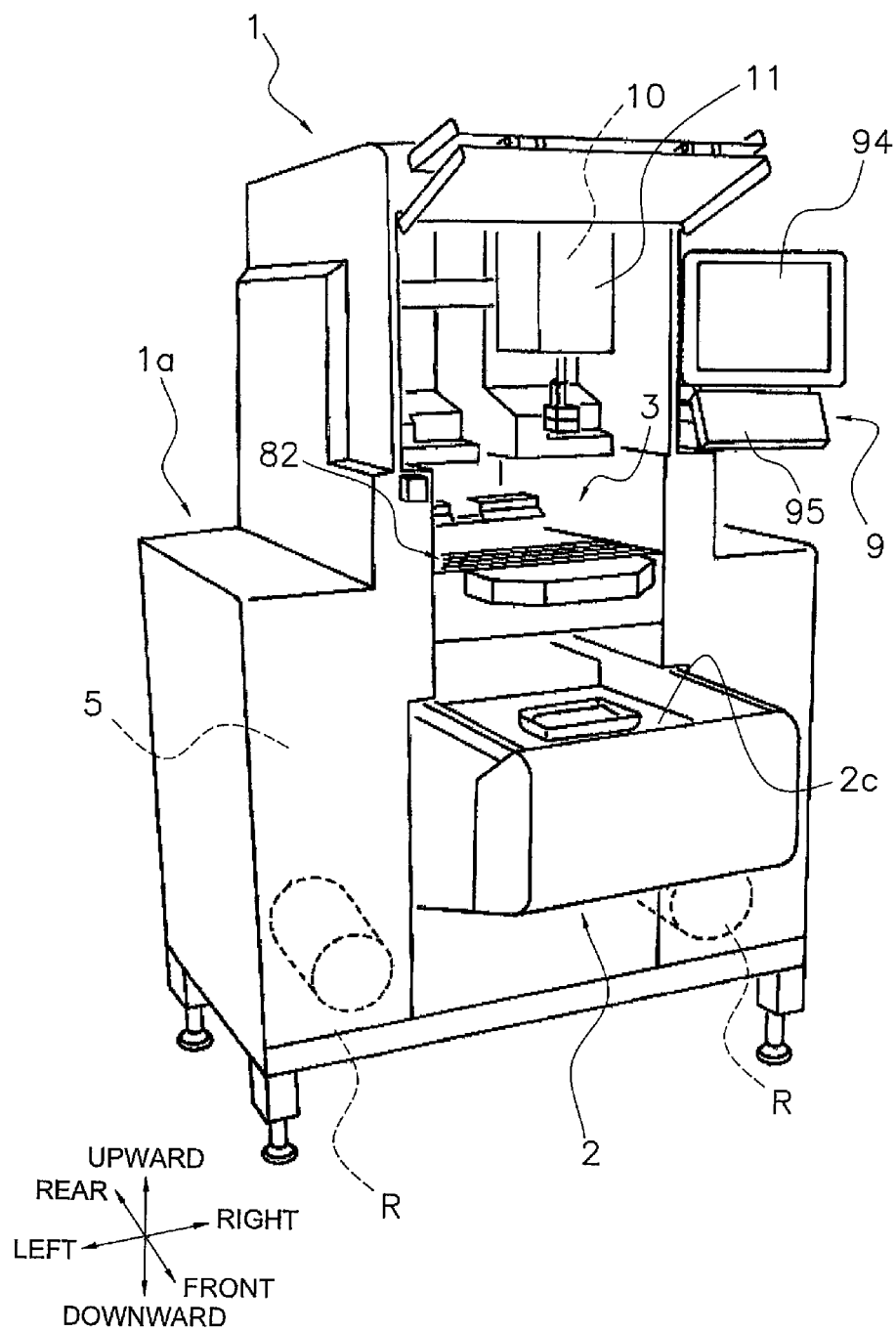
F I G. 1

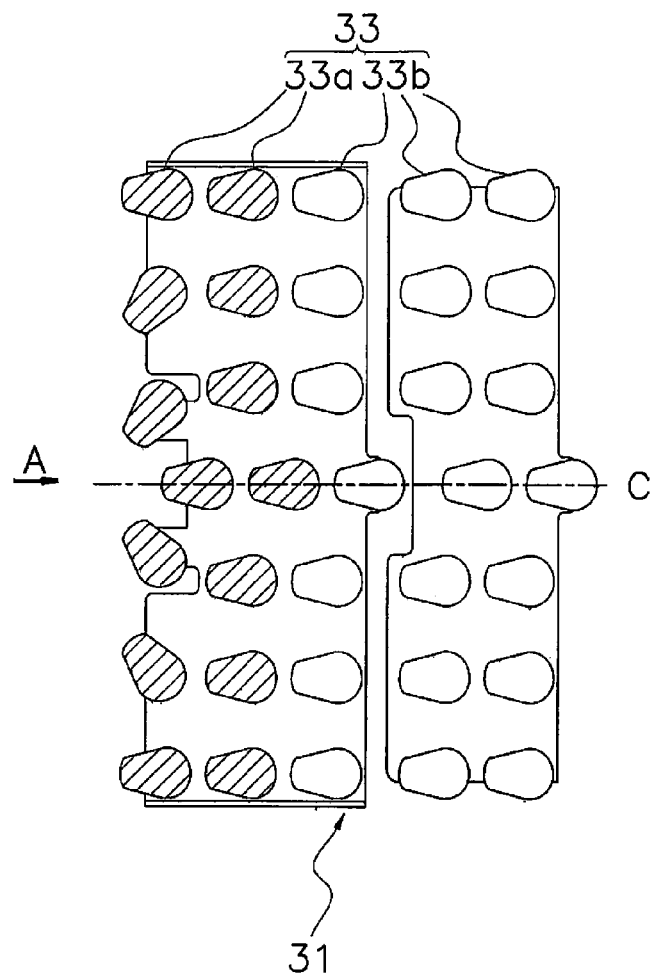
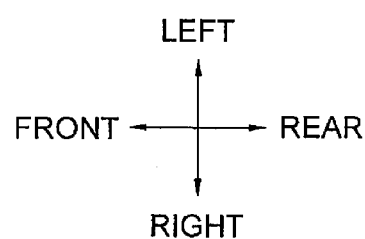
FIG. 5

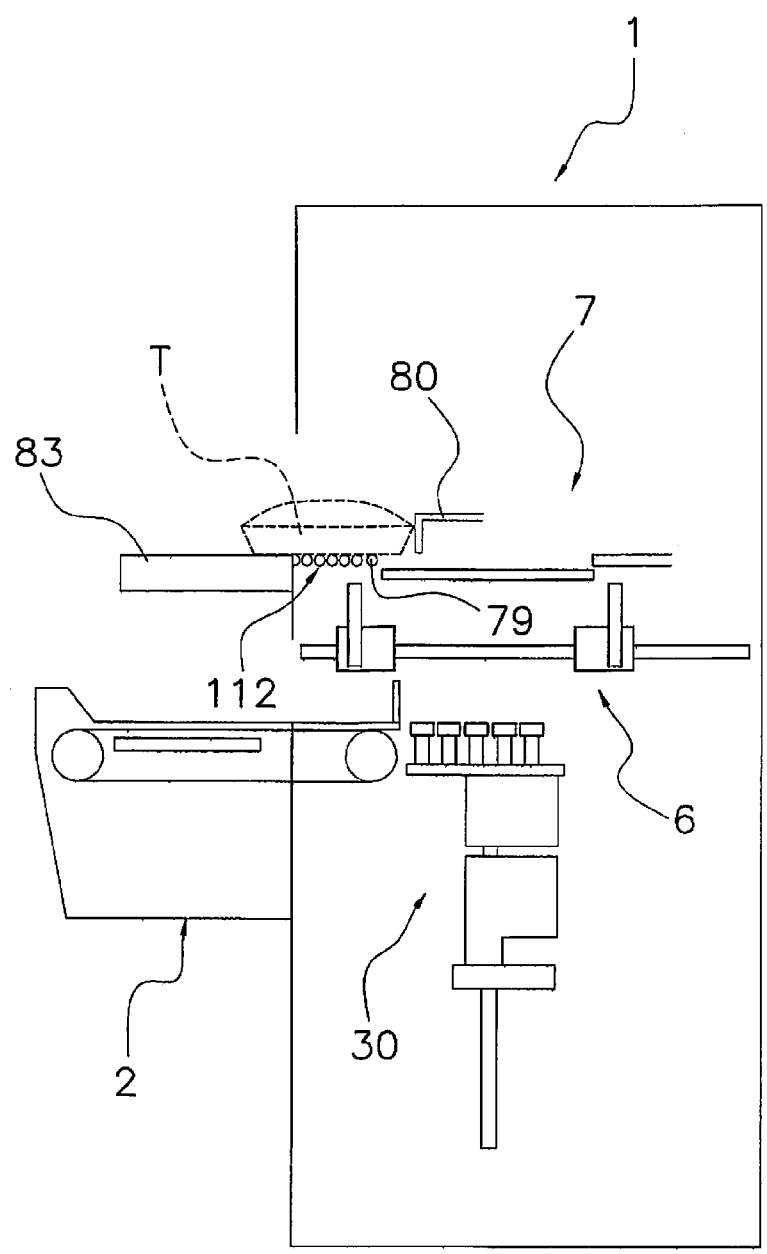
F I G. 1 1

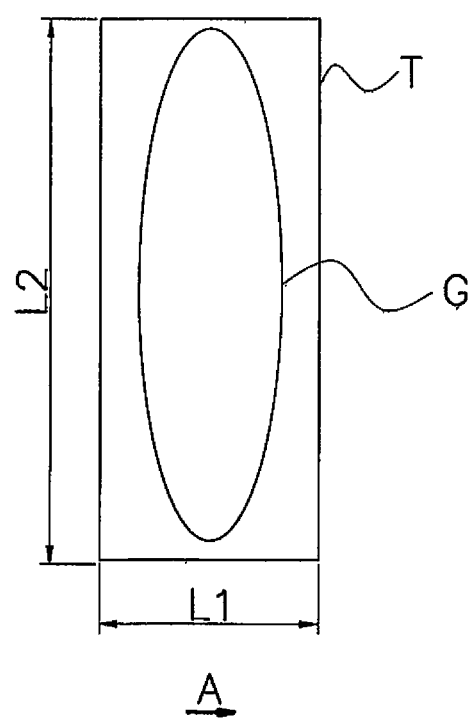
F I G. 1 3

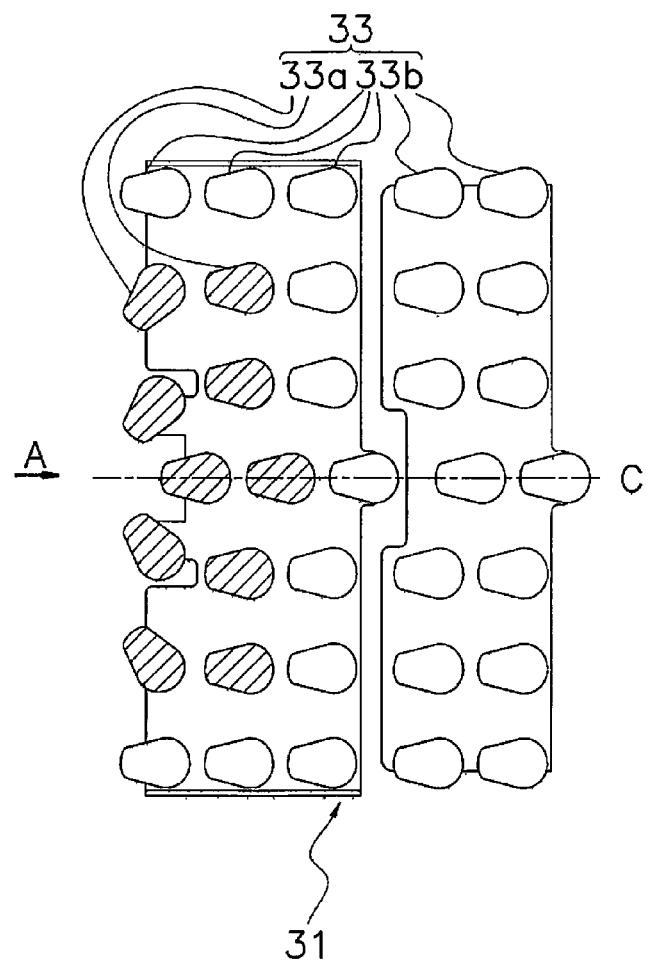
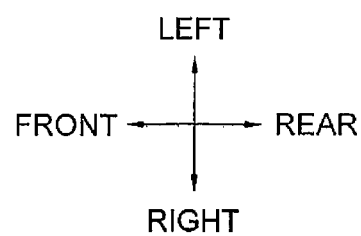
FIG. 14

STRETCH PACKAGING MACHINE

CROSS-REFERENCE TO RELATED APPLICATIONS

This U.S. utility application claims priority under 35 U.S.C. § 119(a) to Japanese Utility Model Patent Application No. 2014-004189, filed in Japan on Aug. 6, 2014, the entire contents of which are hereby incorporated herein by reference.

TECHNICAL FIELD

The present invention relates to a stretch packaging machine.

BACKGROUND ART

Stretch packaging machines are known in which a container having an opening on top thereof is slidingly moved over loading members onto a lift mechanism having a plurality of loading members, pushed upward by the lift mechanism, and pressed against a film retained under tension, whereby the opening is closed (see, for example, Japanese Laid-open Patent Publication No. 2004-262514).

SUMMARY OF THE INVENTION

Problems to be Solved by the Invention

In such a stretch packaging machine, depending on the shape and other characteristics of the container, problems may be presented in which the container tumbles when moved onto the lift mechanism and, for example, an object to be packaged in the container thereby spills out of the container.

An object of the present invention is to provide a stretch packaging machine in which a container having an opening at the top thereof is slidingly moved over loading members onto a lift mechanism having a plurality of loading members and the container can easily be prevented from tumbling while being moved onto the lift mechanism.

Means for Solving the Problems

A stretch packaging machine according to a first aspect of the present invention lifts a container from below against a film retained under tension, the container having an opening at a top thereof, and thereby closes the opening of the container. The stretch packaging machine comprises a lift mechanism and a container movement mechanism. The lift mechanism has a plurality of loading members on which the container is loaded and lifts up the container on the loading members toward the film. The container movement mechanism moves the container slidingly over the loading members of the lift mechanism in a moving direction to a predetermined position on the loading members. In the lift mechanism, the frictional coefficient of at least a first group of the loading members, which is configured to contact with the container and disposed on a near side in the moving direction in which the container is moved by the container movement mechanism, is smaller than the frictional coefficient of a second group of the loading members disposed on a far side in the moving direction.

In the stretch packaging machine according to the first aspect of the present invention, among the plurality of loading members of the lift mechanism, at least the first group of the loading members which are configured to contact with the container and arranged on the near side in the moving direction of the container has a relatively low frictional coefficient. In other words, among the loading members of the lift mechanism, the first group of the loading members which firstly contact with the container being moved are configured to be slippery. The moving container can therefore be prevented from catching on the first group of the loading members and then tumbling when the container reaches the second group of the loading members of the lift mechanism. The frictional coefficient of the second group of the loading members disposed on the far side in the moving direction of the container is relatively large (larger than the frictional coefficient of the loading members disposed on the near side in the moving direction). The container can therefore be prevented from sliding over the second group of the loading members and moving to an unintended position. As a result, it is possible to enhance the positional precision with which the container is conveyed.

A stretch packaging machine according to a second aspect of the present invention is the stretch packaging machine according to the first aspect of the present invention, a length of the container in the moving direction is less than a length thereof in a direction orthogonal to the moving direction.

Here, as the loading members on the near side in the moving direction are configured to be slippery among the loading members of the lift mechanism, the container can therefore easily be prevented from tumbling even when the container is short in the moving direction and tends to tumble in the moving direction.

A stretch packaging machine according to a third aspect of the present invention is the stretch packaging machine according to the first or second aspect of the present invention, the lift mechanism further has a support member for supporting the loading members. The loading members are configured so as to be detachable from the support members.

Here, as the loading members are configured so as to be detachable from the support member, loading members having different frictional coefficients can therefore be arranged as appropriate for the container. The container can therefore easily be prevented from tumbling.

Advantageous Effects of Invention

In the stretch packaging machine according to the present invention, among the plurality of loading members of the lift mechanism, at least the first group of the loading members being configured to contact with the container and arranged on the near side in the moving direction of the container have a relatively low frictional coefficient. In other words, among the loading members of the lift mechanism, the first group of the loading members which firstly contacts with the container being moved are configured to be slippery. The moving container can therefore be prevented from catching on the first group of the loading members and then tumbling when the container reaches the second group of the loading members of the lift mechanism. The frictional coefficient of the second group of the loading members disposed on the far side in the moving direction of the container is configured to be relatively large, and the container can therefore be prevented from sliding over the second group of the loading members and moving to an unintended position. As a result, it is possible to enhance the positional precision with which the container is conveyed.

BRIEF DESCRIPTION OF THE DRAWINGS

FIG. 1 is a perspective view illustrating the exterior of the stretch packaging machine according to an embodiment of the present invention.

FIG. 5 is a plan view illustrating the arrangement of the loading members of the lift mechanism of the stretch packaging machine illustrated in FIG. 1.

FIG. 11 is a view (4 of 5) illustrating the operation of the stretch packaging machine illustrated in FIG. 1.

FIG. 13 is a plan view from above, illustrating an example of the shape of the tray packaged by the stretch packaging machine illustrated in FIG. 1.

FIG. 14 is a plan view illustrating another arrangement of the loading members of the lift mechanism in the stretch packaging machine.

DESCRIPTION OF EMBODIMENTS

The stretch packaging machine 1 according to an embodiment of the present invention is described below with reference to the accompanying drawings. The embodiment described below is an example and does not limit the present invention; it being possible to make various modifications thereto within the intended scope of the present invention.

In the description below, expressions such as "front (frontal)," "rear (back)," "left," "right," "upward," and "downward" may be used to describe directions, arrangements, or the like and unless otherwise specified, these expressions represent directions, arrangements or the like as indicated by the arrows in FIG. 1. Arrows representing "front", "rear", "left", "right", "upward", and "downward" also appear in FIGS. 2 through 5. The directions indicated by the arrows in FIGS. 2 through 5 are the same as the directions indicated by the arrows in FIG. 1.

Figure 2:
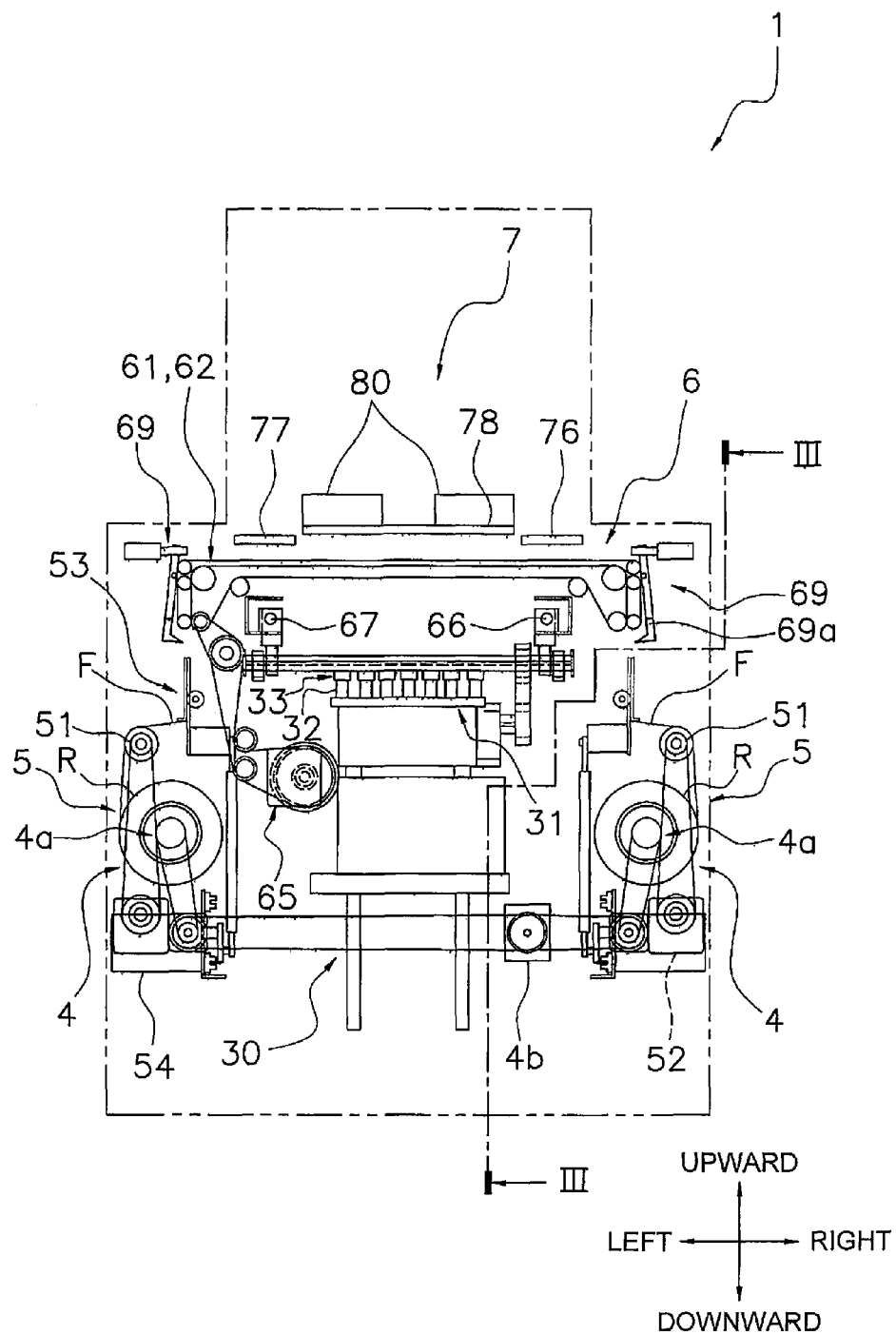
FIG. 2 is a front view illustrating the overall configuration of the inside of the stretch packaging machine illustrated in FIG. 1.

The stretch packaging machine 1 according to the present embodiment is a transverse-film-feed-type stretch packaging machine (see FIG. 2). In the stretch packaging machine 1, an tray T with an opening on top into which an article G such a perishable food product is placed is pressed from below against a stretch film F drawn out from a film roll R and retained under tension, and the opening of the tray T is closed. Specifically, the stretch packaging machine 1 pushes or lifts up the tray T into which the article G is placed toward the stretch film F retained under tension and folds a peripheral edge part of the film F under the tray T, and thereby packages an object to be packaged, which comprises the tray T and the article G, with the film. In addition to a film packaging function, the stretch packaging machine 1 is provided with a weighing function, and a pricing function by affixing a label.

The tray T is an example of a container. As illustrated in FIG. 13, the tray T is formed to a rectangular shape in plan view, in which a length L1 of the tray T in a moving direction A in which the tray is moved by a tray movement mechanism 2b described below is less than a length L2 of the tray T in a direction orthogonal to the moving direction A. The shape of the tray T is described herein by way of example and is not limited to the shape illustrated in FIG. 13.

(1) Overview

Figure 3:
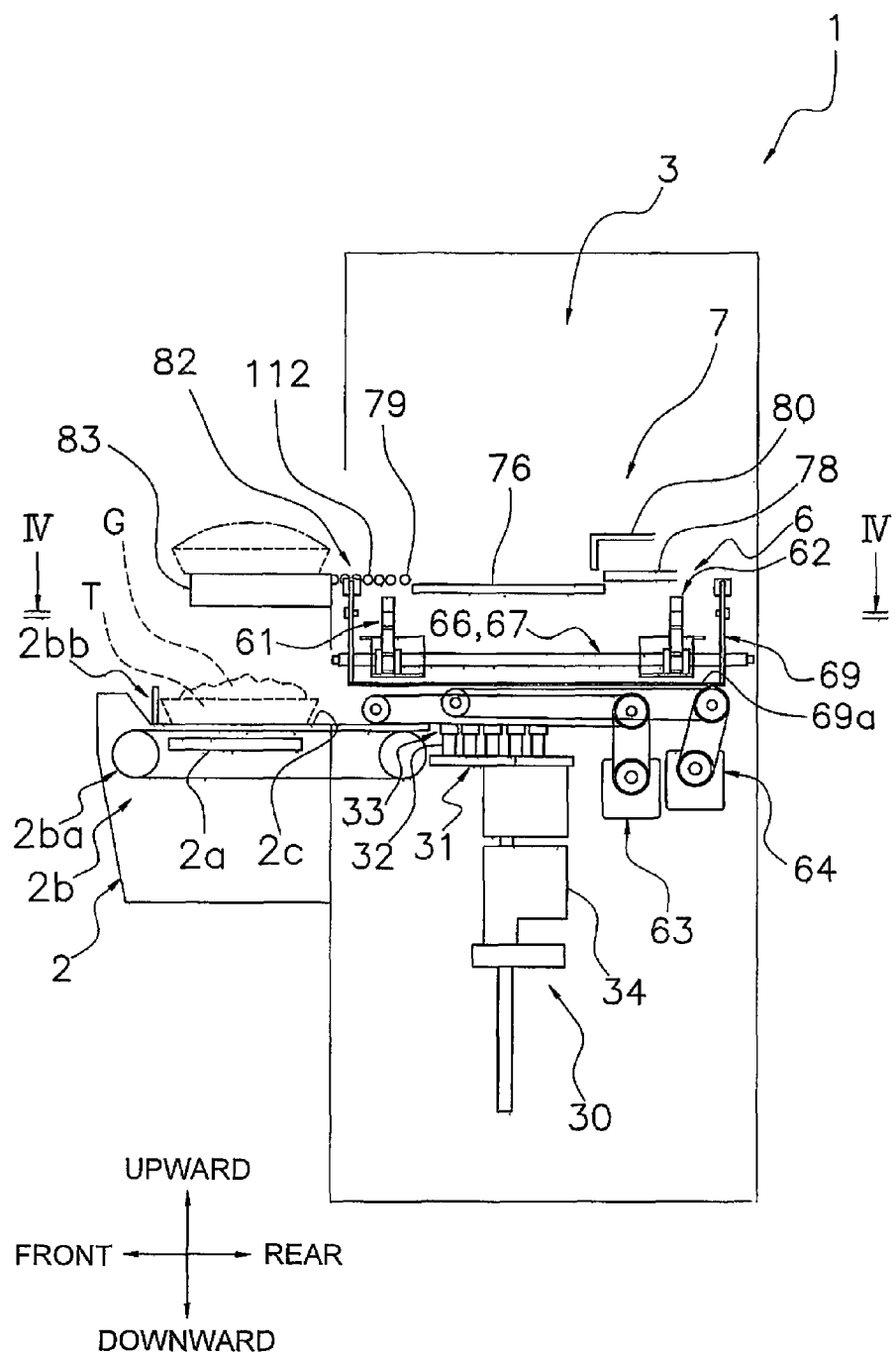
FIG. 3 is a schematic arrow view III-III of FIG. 2.
Figure 4:
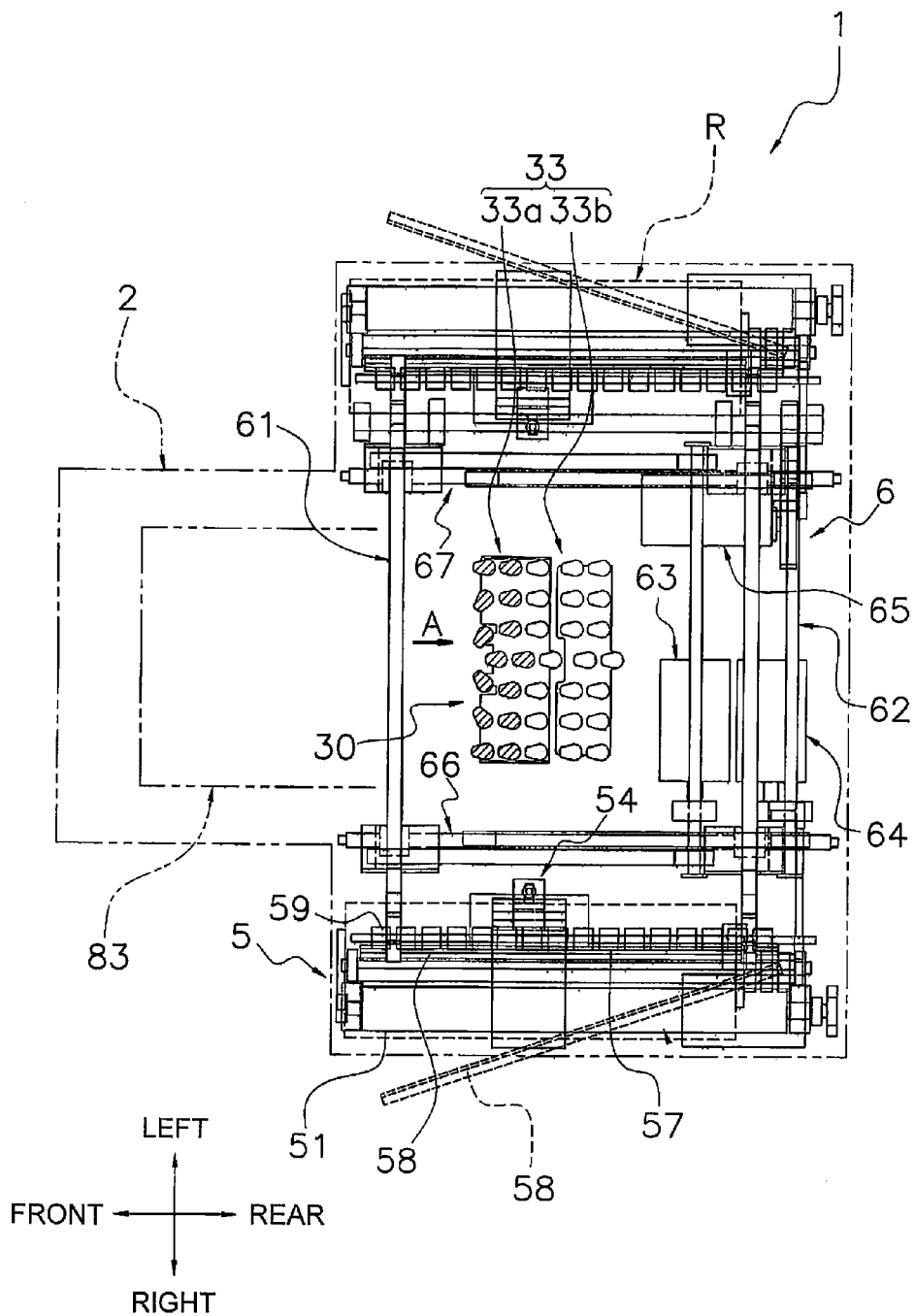
FIG. 4 is a schematic arrow view IV-IV of FIG. 3.

The stretch packaging machine 1 is provided primarily with a weighing/carry-in mechanism 2, a packaging station 3, a lift mechanism 30, roll support mechanisms 4, film delivery mechanisms 5, a film conveyance mechanism 6, cutter mechanisms 69, a folding mechanism 7, and a heating mechanism 82 (see FIGS. 2 through 4).

The weighing/carry-in mechanism 2 is provided in a center part of a front of a main body 1a. The weighing/carry-in mechanism 2 measures the weight of the article G in the tray T and conveys the tray T to the packaging station 3. The packaging station 3 is a space formed in the main body 1a. A roll support mechanism 4 is provided on each of left and right sides of the main body 1a, and each retains a film roll R. The film rolls R is a roll member which is formed by wounding an elongated stretch film F having a specific predetermined width in multiple layers. The film delivery mechanism 5 delivers the film F drawn out from either of the film rolls R upward. The film conveyance mechanism 6 receives the film F from the film delivery mechanisms 5 and conveys the film F toward the packaging station 3. The cutter mechanisms 69 cut the film F transferred from the film delivery mechanisms 5 to the film conveyance mechanism 6 at a predetermined length. In the packaging station 3, the lift mechanism 30 presses an object to be packaged (here, the tray T having the article G therein), which is moved by the weighing/carry-in mechanism 2 on loading members 33 (described hereinafter), against the film F which is retained under tension by the film conveyance mechanism 6. The folding mechanism 7 wraps the object to be packaged with the film F. The heating mechanism 82 applies heat to and heat-seals the film F folded by the folding mechanism 7 under the object to be packaged in overlapping fashion.

The stretch packaging machine 1 also has a controller 9 for controlling each part of the stretch packaging machine 1. The controller 9, which comprises a computer provided with a display panel 94, operating keys 95, and other components, is disposed in an upper part of the main body 1a (see FIG. 1). The controller 9 controls the operation of each part of the stretch packaging machine 1 including the mechanisms described above. The controller 9 also performs functions such as calculating a price of an article G weighed by the weighing/carry-in mechanism 2 based on a signal indicating the weight of the article G, and controlling the action of a label printer 10 for printing the weight, price, or other information of the article G on a label and a label dispenser 11 (see FIG. 1). The display panel 94 is a touch-panel-type display, on which operating buttons are arranged. The computer has a storage unit 96 (see FIG. 7), and data relating to the film F (e.g., material, width, pattern, and the like) or data relating to the object (the article G and the tray T) to be packaged (e.g., the name or unit price of the article G, the size of the tray T, and the like), which are inputted from the display panel 94, the operating keys 95, or another component or transferred from an external device, are stored in the storage unit 96.

(2) Detailed Description (2-1) Weighing/Carry-in Mechanism

The weighing/carry-in mechanism 2 is a mechanism for measuring the weight of the article G such as food product accommodated in the tray T and conveying the tray T having the article G therein to the packaging station 3.

The weighing/carry-in mechanism 2 has primarily a scale 2a and the tray movement mechanism 2b (see FIG. 3).

The scale 2a measures the weight of the article G accommodated in the tray T.

The tray movement mechanism 2b moves the tray T having the article G therein onto the loading members 33 of the lift mechanism 30 (described hereinafter). The tray movement mechanism 2b moves the tray T on the loading members 33 of the lift mechanism 30 so as to slide the tray T over the loading members 33. The tray movement mechanism 2b has two carry-in belts 2ba extended between a pair of rollers disposed at a front and rear thereof (see FIG. 3). The tray movement mechanism 2b has a conveyance member 2bb engaged with both carry-in belts 2ba and driven by the carry-in belts 2ba between the two carry-in belts 2ba (see FIG. 3).

In the weighing/carry-in mechanism 2, when a tray T accommodating an article G is loaded on a tray T conveyance, face 2c and the scale 2a (i.e., a portion of the conveyance face 2c also serves as a stage of the scale 2a on which the object to be weighed is loaded), the weight of the article G is measured by the scale 2a. When the carry-in belts 2ba are then driven by a motor (not shown), the conveyance member 2bb engaged with the carry-in belts 2ba moves from front to rear. At this time, the conveyance member 2bb comes in contact with a front side of the tray T, pushes and slides the tray T rearward over the conveyance face 2c, and moves the tray T horizontally to the loading members 33 of the lift mechanism 30. The conveyance member 2bb pushes the tray T which has reached the loading members 33 further to the rear, and slides the tray T over the loading members 33 so as to move the tray T to a predetermined position on the loading members 33.

(2-2) Packaging Station

The packaging station 3 is a space formed in the main body 1a. In the packaging station 3, a series of film packaging processes are performed on the object to be packaged (tray T accommodating the article G) that has been weighed.

Specifically, film packaging processing of the object to be packaged such as described below is performed in the packaging station 3. In the packaging station 3, the stretch film F is stretched by the film conveyance mechanism 6, and the lift mechanism 30 pushes up the tray T accommodating the article G toward the stretched film F (see FIG. 10). Folding plates 76 through 78 and a front folding rod 79 (described hereinafter) of the folding mechanism 7 fold a peripheral portion of the film F in toward a bottom side of the tray T which is thrusted to the film F upward from below, and the tray T accommodating the article G is thereby covered by the film F (see FIG. 11).

The lift mechanism 30 for pushing (thrusting) the tray T upward is provided in a lower part of the packaging station 3 (see FIG. 3).

A presser mechanism (not shown), which serves to prevent the tray T from coming out of position and tumbling when the tray T is pushed up by the lift mechanism 30 and stopped in an elevated position, is disposed in an upper part of the packaging station 3. The presser mechanism also serves to press the tray T against a heating roller 112 (described hereinafter) of the heating mechanism 82 when the tray T covered by the film F is pushed out toward a discharge platform 83 by a discharge pusher 80 (described hereinafter) of the folding mechanism 7 and the film F folded under the tray T is heat-sealed by the heating roller 112.

(2-3) Lift Mechanism

The lift mechanism 30 is provided in the lower part of the packaging station 3. The lift mechanism 30 supports a bottom face of the tray T and moves the tray T upward, and pushes the tray T upward toward the film F retained under tension.

The lift mechanism 30 has primarily a support base 31, a plurality of support bars 32 (here, the number of the support bars is 35), a loading member 33 provided above each of the support bars 32, and a rack and pinion mechanism 34 (see FIG. 3).

Figure 6:
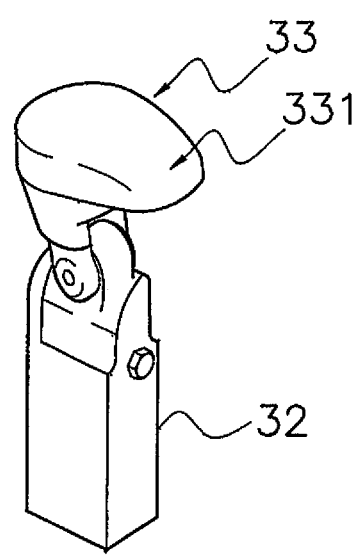
FIG. 6 is an enlarged view of a support bar and a loading member of the lift mechanism in the stretch packaging machine illustrated in FIG. 1.

The support bars 32 are examples of support members. The support bars 32 extend upward from a tabular support base 31 (see FIG. 3). Upper parts of the support bars 32 are connected to lower parts of the loading members 33 (see FIG. 6). The support bars 32 have rotary shafts for rotatably supporting the loading members 33 so that each of the loading members 33 can pivot in a predetermined direction (front-rear, left-right, or a combination of these directions). The loading members 33 pivot about the rotary shafts described above and temporarily invert with respect to the support bars 32 when left and right folding plates 76, 77 or a rear folding plate 78 (described hereinafter) of the folding mechanism 7 come in under the tray T. As the loading members 33 are configured to be pivotable with respect to the support bars 32, and the film F can easily be folded under the tray T by the folding mechanism 7.

Each loading member 33 is roughly egg-shaped (distortedly elliptical) in plan view (see FIG. 5). Around an end part of a narrowly shaped side of each loading member 33 in plan view, an inclined face 331 which becomes lower toward the end part is provided on an upper face of each loading member 33 (see FIG. 6). Each loading member 33 is attached to a support bar 32 so that the narrow side thereof in plan view is disposed on a front side (see FIG. 5). Each loading member 33 is detachably attached to the support bar 32 for supporting the loading member 33. Among the loading members 33, some of the loading members 33 disposed in a frontmost row (the row closest to the weighing/carry-in mechanism 2) are attached so as to be inclined in relation to the front-rear direction so that the narrow sides thereof in plan view are oriented toward a center line C of the support base 31, extending in the front-rear direction (see FIG. 5). The other loading members 33 are attached so that the narrow sides thereof in plan view face forward.

The tray T conveyed by the tray movement mechanism 2b is loaded on the loading members 33. The loading members 33 are moved up and down by the rack and pinion mechanism 34 (described hereinafter).

In a state in which the loading members 33 are lowered by the rack and pinion mechanism 34, the conveyance face 2c of the tray T on which the tray T is conveyed from the weighing/carry-in mechanism 2, and conveyance faces of the loading members 33 on which the tray T moves in sliding fashion are at roughly the same height. In this state, the tray movement mechanism 2b moves the tray T in a horizontal direction from the weighing/carry-in mechanism 2 onto the loading members 33.

Meanwhile, when the loading members 33 on which the tray T is loaded are pushed upward by the rack and pinion mechanism 34, the object to be packaged (tray T accommodating the article G) is pressed against the film F retained under tension.

The rack and pinion mechanism 34 is a mechanism for raising and lowering the loading members 33. In the rack and pinion mechanism 34, a pinion fixed via a gear box to an output shaft for outputting rotation from a servo motor raises and lowers a rack (not illustrated) to be meshed with the pinion. The rack and pinion mechanism 34 raises and lowers the rack, whereby the support base 31 fixed to an upper part of the rack moves up and down. As a result, the support bars 32 extending upward from the support base 31, as well as the loading members 33 disposed above the support bars 32, move up and down. In particular, when the loading members 33 are moved upward, the tray T on the loading members 33 is pushed upward toward the film F retained under tension.

The rack and pinion mechanism 34 is an example of a mechanism for moving the support base 31 (loading members 33) up and down, the type of mechanism not being limited to a rack and pinion mechanism. For example, an electric ball screw mechanism may be used instead of a rack and pinion mechanism as a mechanism for moving the support base 31 up and down.

The loading members 33 are classified into two groups, first loading members 33*a* (a first group of the loading members 33) and second loading members 33*b* (a second group of the loading members 33), according to a difference in a material used in portions thereof for coming in contact with the tray T. The materials of the first loading members 33*a* and the second loading members 33*b* are selected so that the frictional coefficient of the first loading members 33*a* is smaller than the frictional coefficient of the second loading members 33*b*. In other words, a material having a relatively low frictional coefficient is used in the first loading members 33*a*, and a material having a relatively large frictional coefficient is used in the second loading members 33*b*.

In the lift mechanism 30, the first loading members 33*a* are disposed on a near side in the moving direction A in which the tray T is moved by the tray movement mechanism 2*b*. In other words, the first loading members 33*a* are disposed on a front side of the lift mechanism 30, because the moving direction A in which the tray T is moved by the tray movement mechanism 2*b* is rearward, as indicated by the arrow in FIG. 4. Specifically, the two rows of loading members 33 (the loading members 33 indicated by hatching in FIG. 5) on the front side of the lift mechanism 30 are the first loading members 33*a*. The second loading members 33*b* are disposed on a far side in the moving direction A in which the tray T is moved by the tray movement mechanism 2*b*, i.e., on a rearward side of the lift mechanism 30. Specifically, the three rows of loading members 33 (the loading members 33 not indicated by hatching in FIG. 5) on the rearward side of the lift mechanism 30 are second loading members 33*b*.

The arrangement of first loading members 33*a* and second loading members 33*b* in the lift mechanism 30 is an example and does not limit the present invention. In the loading members 33 disposed on the near side in the moving direction A in which the tray T is moved by the tray movement mechanism 2*b* in the lift mechanism 30, at least the loading members 33 being configured to contact with the tray T may be configured as first loading members 33*a*. For example, when the length L2 of the tray T in the direction orthogonal to the moving direction is relatively small, the center five (five excluding the two at each of the left and right ends) loading members in the each of two rows of loading members 33 on the front side of the lift mechanism 30 may be configured as first loading members 33*a*, and the two loading members at each of the left and right ends in the each of two rows may be configured as second loading members 33*b*, as illustrated in FIG. 14 (as can also be seen from FIG. 14, loading members 33 indicated by hatching are first loading members 33*a*, and loading members 33 not indicated by hatching are second loading members 33*b*.).

For example, an arrangement of loading members 33 such as the arrangement illustrated in FIG. 14 may be achieved by removing the two first loading members 33*a* at each of the left and right ends from the support bars 32 and attaching second loading members 33*b* instead in each of the two rows of loading members 33 on the front side of the lift mechanism 30 in which the loading members 33 are arranged in the manner illustrated in FIG. 5, according to the size of the tray T.

In the loading members 33 disposed on the near side in the moving direction A of the tray T, at least the loading members 33 being configured to contact with the tray T are configured as the first loading members 33*a*, the tray T moved to the lift mechanism 30 by the tray movement mechanism 2*b* firstly come in contact with the first loading members 33*a*, which are formed from a slippery material having a relatively low frictional coefficient. The tray T can therefore be prevented from catching on the first loading members 33*a* and tumbling when the tray T moves on the loading members 33. On the other hand, as the frictional coefficient of the second loading members 33*b* disposed on the far side in the moving direction A of the tray T (on the rear of the lift mechanism 30) is relatively high, and the tray T can be prevented from sliding over the loading members 33 and moving to an unintended position. As a result, it is possible to enhance the positional precision with which the tray T is conveyed.

Here, in plan view, as the length L1 of the tray T in the moving direction A (i.e., the front-rear direction) in which the tray is moved by the tray movement mechanism 2*b* is less than the length L2 of the tray T in the direction (i.e., the left-right direction) orthogonal to the moving direction A in which the tray is moved by the tray movement mechanism 2*b*, as illustrated in FIG. 13, the tray T would tend to be tumbled rearward should the tray T catch on the loading members 33. However, since the first loading members 33*a* are disposed on the near side in the moving direction A of the tray T, it is easy to prevent such tumbling of a tray T that is short in the moving direction A.

As the material of the first loading members 33*a*, polyoxymethylene (POM), for example, is used, and a urethane rubber material, for example, is used in the material of the second loading members 33*b*. These materials are cited by way of example, and appropriate materials may be selected for the first loading members 33*a* and the second loading members 33*b* so that the frictional coefficient of the first loading members 33*a* is smaller than the frictional coefficient of the second loading members 33*b*.

(2-4) Roll Support Mechanisms

The roll support mechanisms 4 support the film rolls R.

As illustrated in FIG. 2, the roll support mechanisms 4 are provided on both sides of the main body 1*a* in substantially symmetry with regard to left to right. The roll support mechanisms 4 have primarily a roll bar 4*a* and a film roll drive motor 4*b* (see FIG. 2).

The roll bar 4*a* is inserted through a film roll R, and retains the film roll R with a holder or the like. The roll bars 4*a* are each rotatably supported by the main body 1*a* and driven by a single film roll drive motor 4*b*. The film roll drive motor 4*b* can rotate forward and in reverse, and drives one roll support mechanism 4 when rotating forward and drives the other roll support mechanism 4 when rotating in reverse.

(2-5) Film Delivery Mechanisms

The film delivery mechanisms 5 are mechanisms for transferring film F drawn out from either of the film rolls R to a pair of feeder units 61, 62 (described hereinafter) of the film conveyance mechanism 6.

As illustrated in FIG. 2, each of the film delivery mechanisms 5 has primarily a feeding roller 51, a feeding motor 52 for rotating the feeding roller 51, a film insertion plate unit 53, and a film insertion plate drive motor 54 for moving the film insertion plate unit 53 up and down.

The feeding rollers 51 are rollers disposed diagonally above from the film rolls R retained in the roll support mechanisms 4, and disposed to the outside relative to the film rolls R (see FIG. 2). The feeding rollers 51 extend along a longitudinal direction of the film rolls R. The feeding rollers 51 are linked to the feeding motors 52 via belts and rotated by the action of the feeding motors 52.

As illustrated in FIG. 2, the film insertion plate units 53 are disposed above the respective film rolls R supported by the roll support mechanisms 4. Each of the film insertion plate units 53 is configured primarily from two plate members 57, 58 and a one-way roller 59 (see FIG. 4). The film insertion plate units 53 retain the film F with the two plate members 57, 58 and the one-way roller 59.

The film insertion plate drive motors 54 are provided in order to move the film insertion plate units 53 up and down, and move the film insertion plate units 53 up and down via link mechanisms. The film insertion plate units 53 are raised and lowered by the film insertion plate drive motors 54, and thereby transfer the film F to the film conveyance mechanism 6.

(2-6) Film Conveyance Mechanism

The film conveyance mechanism 6 receives the film F fed by the film delivery mechanism 5 from the film rolls R, conveys the film F to a center portion of the packaging station 3, and retains the film F under tension.

The film conveyance mechanism 6 has primarily a first feeder unit 61, a second feeder unit 62, a first feeder movement unit 63, a second feeder movement unit 64, and a feeder drive unit 65 (see FIGS. 2 through 4).

The first feeder unit 61 is disposed on the near side (front side) of the stretch packaging machine 1 as viewed from the front thereof, and the second feeder unit 62 is disposed on the far side (rearward side) of the stretch packaging machine 1 as viewed from the front thereof (see FIGS. 3 and 4). The first and second feeder units 61, 62 hold both front and rear lateral parts (lateral parts on the near side and the far side) of the transverse-fed film F with top and bottom belts and convey the film F by the action of the feeder drive unit 65.

The first feeder unit 61 and the second feeder unit 62 are configured so as to move in a width direction (left-right direction) of the film F by the action of the first feeder movement unit 63 and the action of the second feeder movement unit 64, respectively. Each of the feeder units 61, 62 is supported in two locations so as to be able to move in the width direction of the film F by slide shafts 66, 67 extending along the width direction of the film F.

(2-7) Cutter Mechanisms

The cutter mechanisms 69 are mechanisms for cutting the film F between the mechanisms 5 and 6 after a predetermined amount of the film F transferred from the film delivery mechanisms 5 to the film conveyance mechanism 6 has been conveyed by the film conveyance mechanism 6.

The cutter mechanisms 69 are disposed between the film delivery mechanisms 5 and the film conveyance mechanism 6 in a direction in which the film F is conveyed. A cutter mechanism 69 is provided for the film F fed from the left-side film roll R, and a cutter mechanism 69 is provided for the film F fed from the right-side film roll R (see FIG. 2).

Each of the cutter mechanisms 69 has a cutting blade 69a longer than the film width (see FIGS. 2 and 3). In the cutter mechanisms 69, the cutting blades 69a are driven by actuators (not shown), and the film F is thereby cut.

(2-8) Folding Mechanism

The folding mechanism 7 is a mechanism for wrapping the object to be packaged (tray T having the article G therein) with the film F conveyed by the packaging station 3.

As illustrated in FIGS. 2 and 3, the folding mechanism 7 has primarily left and right folding plates 76, 77, a rear folding plate 78, a front folding rod 79, and a discharge pusher 80.

Figure 10:
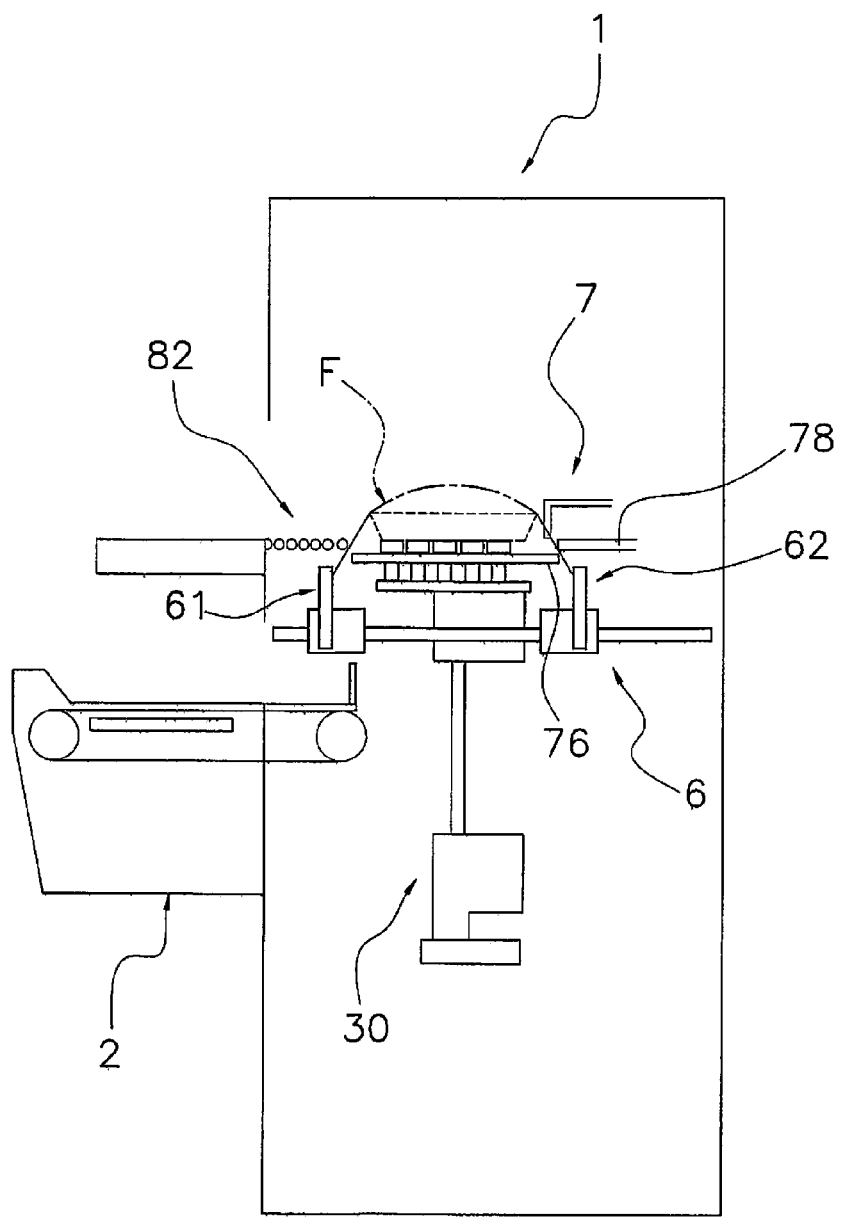
FIG. 10 is a view (3 of 5) illustrating the operation of the stretch packaging machine illustrated in FIG. 1.

The left and right folding plates 76, 77 are configured so as to be horizontally movable in the left-right direction by a timing belt and a motor (not shown). The left and right folding plates 76, 77 fold left and right peripheral edge parts (portions near both end parts in the film conveyance direction) of the film F under the tray T. Specifically, in a state in which the object to be packaged is pressed against the film F by the lift mechanism 30 as illustrated in FIG. 10, the left and right folding plates 76, 77 come in between the tray T and the loading members 33 and fold the left and right peripheral edge parts of the film F in toward the bottom side of the tray T.

The rear folding plate 78 can be moved horizontally in the front-rear direction by a timing belt and a motor (not shown). The rear folding plate 78 folds a rear peripheral edge part of the film F under the tray T. The rear folding plate 78 is disposed higher than the left and right folding plates 76, 77 (see FIGS. 2 and 3). The rear folding plate 78 can therefore fold the film F under the tray T while being superposed on the left and right folding plates 76, 77 in plan view. Specifically, in a state in which the object to be packaged is pressed against the film F by the lift mechanism 30 as illustrated in FIG. 10, the rear folding plate 78 comes in between the tray T and the loading members in a position higher than the left and right folding plates 76, 77 and folds the rear peripheral edge part of the film F in toward the bottom side of the tray T.

The front folding rod 79 is disposed as illustrated in FIG. 3 and other drawings so as to fold a front peripheral edge part (portion near a lateral part on the first feeder unit 61 side) of the film F in toward the bottom side of the tray T during discharge process of the tray T in which the discharge pusher 80 pushes the tray T out toward the discharge platform 83.

The discharge pusher 80 is divided into two units left and right (see FIG. 2) so as not to interfere with the presser mechanism (not illustrated) described above. The discharge pusher 80 can be moved horizontally in the front-rear direction by a timing belt and a motor (not shown). The discharge pusher 80 abuts the tray T and moves the tray T forward after the rear folding plate 78 folds the rear portion of the peripheral edge part of the film F in toward the bottom side of the tray T. At this time, the front folding rod 79 comes in contact with the front peripheral edge part of the film F, and the discharge pusher 80 moves the tray T forward, whereby the front peripheral edge part of the film F is relatively folded in toward the bottom side of the tray T by the front folding rod 79 (see FIGS. 10 and 11).

(2-9) Heating Mechanism

As illustrated in FIG. 3, the heating mechanism 82 is configured from a heating roller 112 and conveyance rollers forward and rearward thereof.

The heating mechanism 82 heat-seals the film F folded under the tray T with the heating roller 112 when the discharge pusher 80 of the folding mechanism 7 pushes the tray T covered by the film F toward the discharge platform 83.

(2-10) Controller

Figure 7:
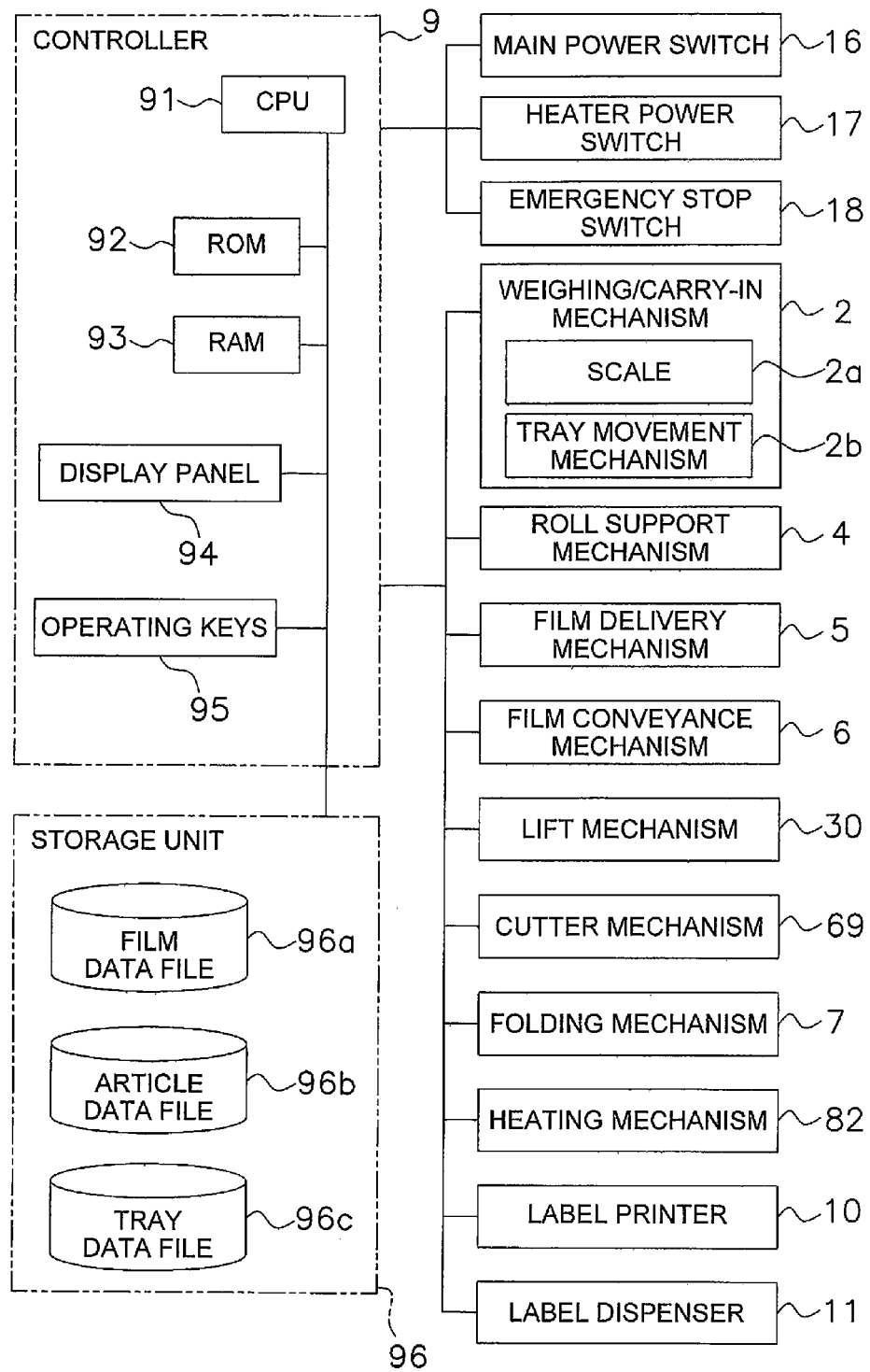
FIG. 7 is a block diagram of the stretch packaging machine illustrated in FIG. 1.
Figure 8:
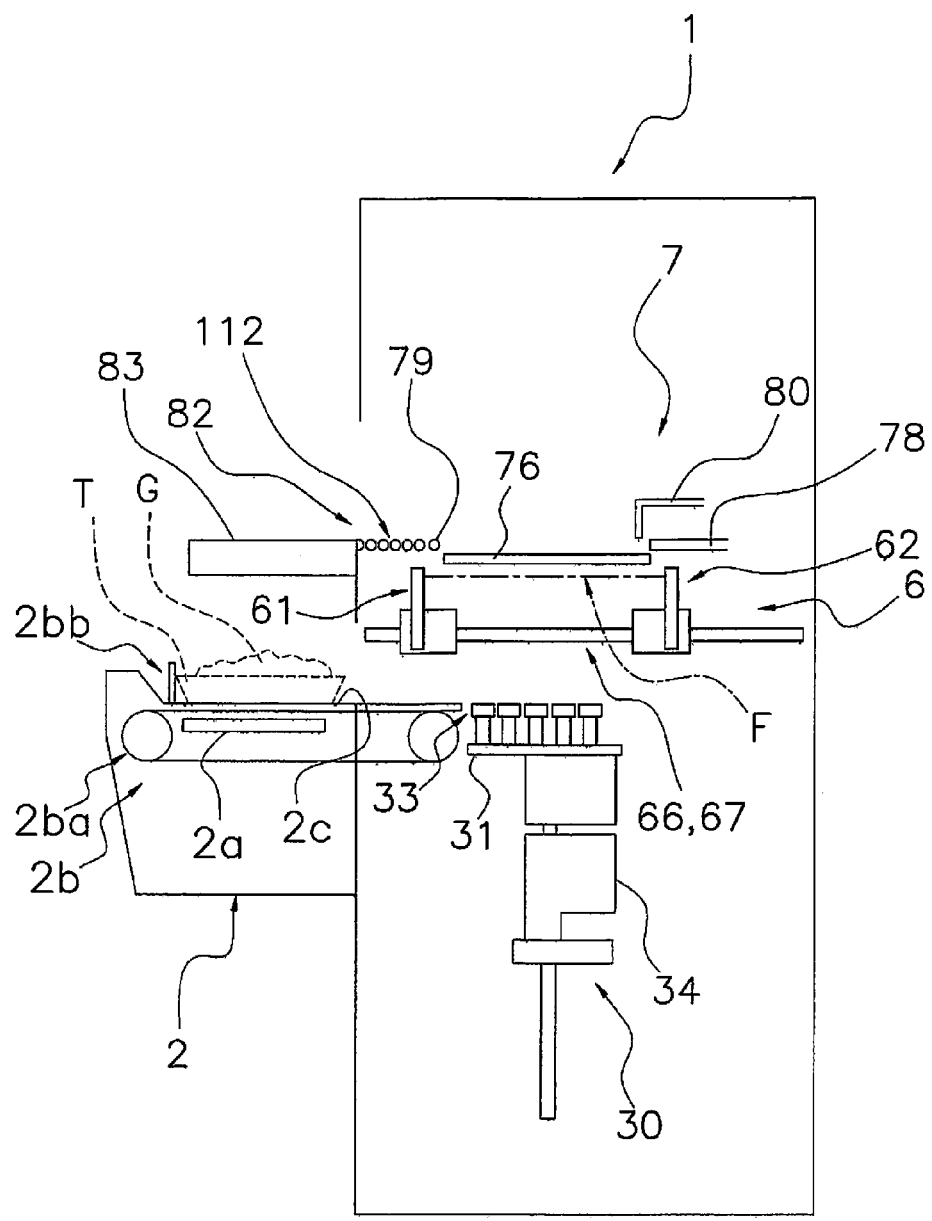
FIG. 8 is a view (1 of 5) illustrating the operation of the stretch packaging machine illustrated in FIG. 1.

The controller 9 is arranged in the upper part of the main body 1a. As illustrated in FIG. 7, the controller 9 is electrically connected to the components of the stretch packaging machine 1 such as weighing/carry-in mechanism 2, the roll support mechanisms 4, the film delivery mechanisms 5, the film conveyance mechanism 6, the lift mechanism 30, the cutter mechanisms 69, the folding mechanism 7, the heating mechanism 82, the label printer 10, the label dispenser 11 and controls the operation of these components.

The controller 9 has a CPU 91, ROM 92, RAM 93, the touch-panel-type display panel 94, the operating keys 95, and other components. The controller 9 is also connected to the storage unit 96 for storing a variety of data so as to be capable of exchanging information therewith. The stretch packaging machine 1 has a main power switch 16, a heater power switch 17, and an emergency stop switch 18 and other switches, and inputs from these switches 16, 17, 18 are transmitted to the controller 9.

A film data file 96a, an article data file 96b, and a tray data file 96c primarily are stored in the storage unit 96. Data relating to characteristics of a plurality of types of film F are stored in the film data file 96a for each type of film F. Unit price data of the article G or data relating to characteristics of the article G are stored in the article data file 96b for each type of article G. Data relating to characteristics of the tray T are stored in the tray data file 96c for each type of tray T.

(3) Operation of the Stretch Packaging Machine

The operation of the stretch packaging machine 1 will be described using FIGS. 8 through 12.

In the stretch packaging machine 1, when an operator places a tray T accommodating an article G on the scale 2a on the conveyance face 2c of the weighing/carry-in mechanism 2, the scale 2a waits until the weighing value stabilizes, and confirms the weighing value. The tray movement mechanism 2b of the weighing/carry-in mechanism 2 then conveys the tray T onto the loading members 33 of the lift mechanism 30. Specifically, the carry-in belts 2ba of the tray movement mechanism 2b are driven, and the conveyance member 2bb engaging with the carry-in belts 2ba thereby moves so as to push the tray T accommodating the article G from the front side thereof, and moves the tray T horizontally over the conveyance face 2c to the loading members 33 of the lift mechanism 30. After the tray T reaches the loading members 33, the conveyance member 2bb furthermore slides the tray T over the loading members 33 and moves the tray T to a predetermined position on the loading members 33 (see FIGS. 8 and 9). When the tray T reaches the loading members 33, the tray T at first contacts the first loading members 33a formed from a material having a relatively low frictional coefficient and disposed on the near side in the moving direction A in which the tray T is moved by the tray movement mechanism 2b (see FIG. 5). The tray T subsequently contacts the second loading members 33b formed from a material having a relatively high frictional coefficient (see FIG. 5).

Figure 9:
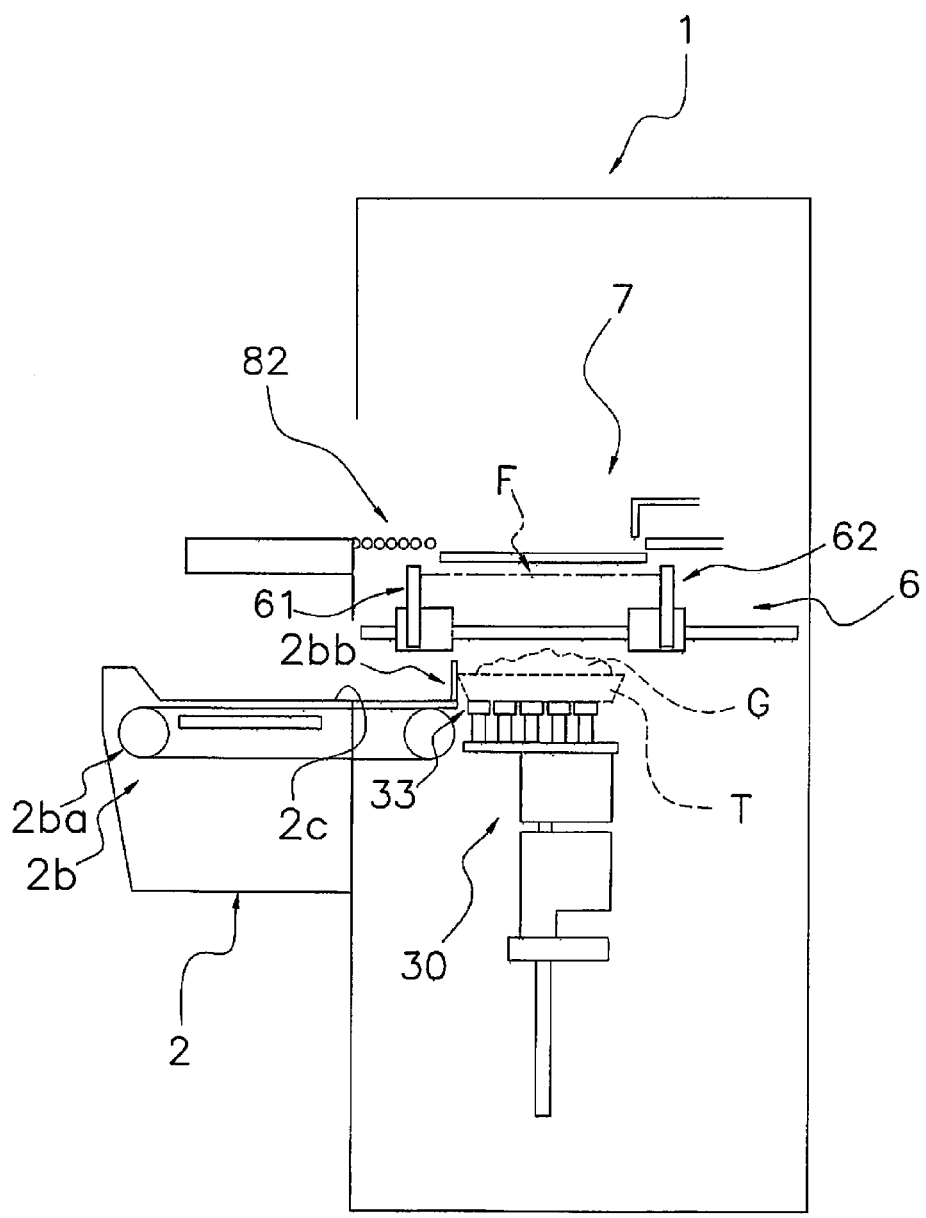
FIG. 9 is a view (2 of 5) illustrating the operation of the stretch packaging machine illustrated in FIG. 1.

Meanwhile, the film F transferred by the film delivery mechanisms 5 from the film rolls R to the film conveyance mechanism 6 is cut by the cutting blades 69a of the cutter mechanisms 69 into a single rectangular sheet of film F, and is transported by both feeder units 61, 62 to a location above the lift mechanism 30. Above the lift mechanism 30, the film F illustrated in FIG. 9 is placed in a state in which the front and rear ends of peripheral edge parts thereof are securely gripped by clamps (not illustrated) of the feeder units 61, 62.

The lift mechanism 30 then pushes the tray T accommodating the article G on the loading members 33 upward against the film F, the peripheral edge parts of which, particularly the front and rear edges of which, are securely gripped (retained under tension) (see FIG. 10). The film F securely gripped at the front and rear ends thereof is then extended so as to cover top parts of the article G and the tray T. The opening at the top part of the tray T is thereby closed.

Figure 12:
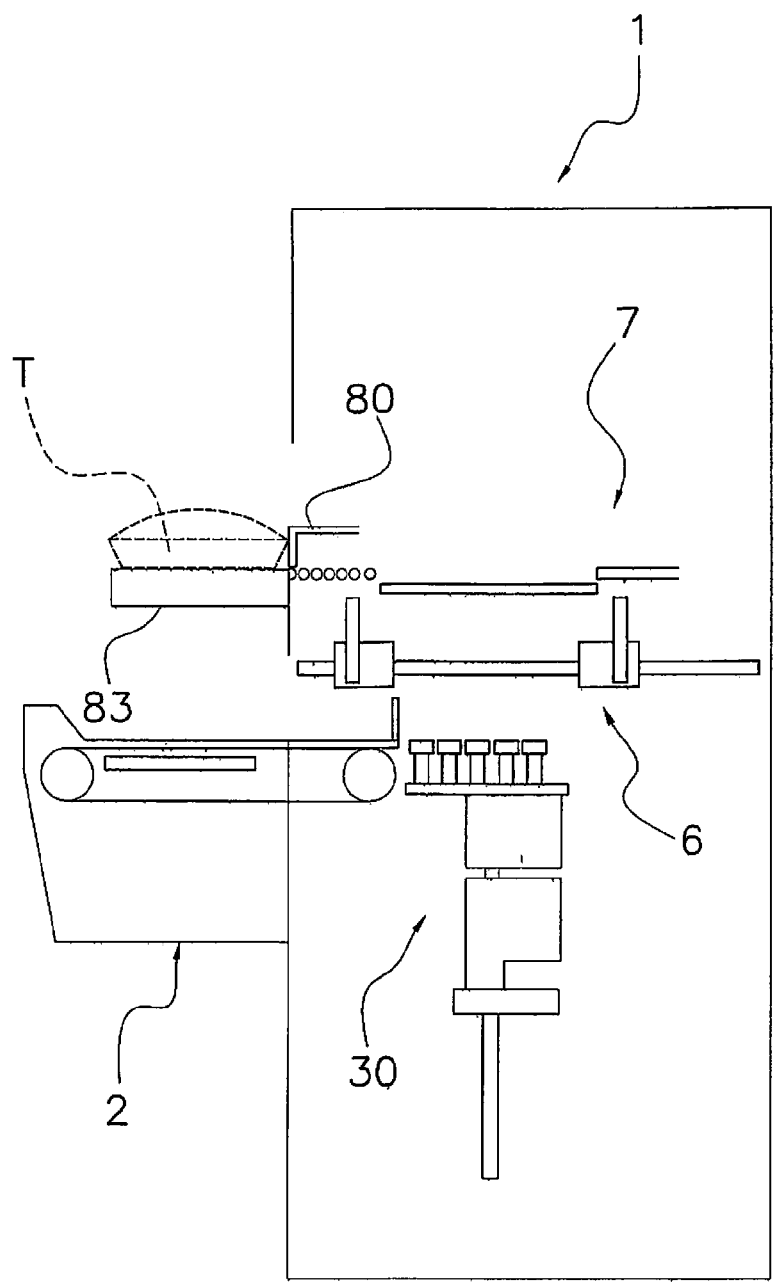
FIG. 12 is a view (5 of 5) illustrating the operation of the stretch packaging machine illustrated in FIG. 1.

In this state, the left and right folding plates 76, 77, and subsequently the rear folding plate 78, are moved horizontally to the bottom side of the tray T. The clamp of the second feeder unit 62 then releases the film F at an appropriate timing, and the left and right portions and rear portion of the peripheral edge parts of the film F are folded toward the bottom side of the tray T. The discharge pusher 80 then pushes the tray T out toward the discharge platform 83 as illustrated in FIG. 11, whereupon the not-yet-folded front portion (portion on the front side) of the peripheral edge part of the film F comes in contact with the front folding rod 79 and is folded in toward the bottom side of the tray T as the tray T moves toward the discharge platform 83. The clamp of the first feeder unit 61 releases the film F at this time. When the tray T passes over the heating mechanism 82 as the tray T moves toward the discharge platform 83, the film F folded on the bottom side of the tray T is heat-sealed by the heating roller 112 (see FIG. 11). At the time of discharge onto the discharge platform 83 as illustrated in FIG. 12, the article G and tray T as a whole are covered by the film F, the film F is heat-sealed below the tray T, and packaging is completed.

When processing including labeling is selected, information such as the weight or price of the object calculated based on the weighing value is printed on a label by the label printer 10, and the label is affixed to the packaged article G and tray T by the label dispenser 11.

(4) Features (4-1)

In the stretch packaging machine 1 according to the embodiment described above, a tray T having with an opening on top is pressed from below against a film F retained under tension, and thereby the opening of the tray T is closed. The stretch packaging machine 1 is provided with a lift mechanism 30 and a tray movement mechanism 2b. The lift mechanism 30 has a plurality of loading members 33 (first loading members 33a and second loading members 33b) on which the tray T is loaded and pushes up the tray T on the loading members 33 toward the film F. The tray movement mechanism 2b moves the tray T slidingly over the loading members 33 of the lift mechanism 30 to a predetermined position on the loading members 33. In the lift mechanism 30, the frictional coefficient of at least the first loading members 33a being configured to contact with the tray T in the loading members 33 disposed on the near side in the moving direction A in which the tray T is moved by the tray movement mechanism 2b is smaller than the frictional coefficient of the second loading members 33b disposed on the far side in the moving direction A.

Here, among the plurality of loading members 33 of the lift mechanism 30, at least the first loading members 33a being configured to contact with the tray T in the loading members 33 on the near side in the moving direction A of the tray T have a relatively low frictional coefficient. In other words, among the loading members 33 of the lift mechanism 30, the first loading members 33a which firstly contact with the moving tray T being moved are configured to be slippery.

The moving tray T can therefore be prevented from catching on the loading members 33 and then tumbling when the tray T reaches the loading members 33 of the lift mechanism 30. The frictional coefficient of the second loading members 33b disposed on the far side in the moving direction A of the tray T is relatively large (larger than the frictional coefficient of the first loading members 33a disposed on the near side in the moving direction A). The tray T can therefore be prevented from sliding over the loading members 33 and moving to an unintended position. As a result, it is possible to enhance the positional precision with which the tray T is conveyed.

(4-2)

As illustrated in FIG. 13, the tray T packaged by the stretch packaging machine 1 according to the embodiment described above is configured so that the length L1 thereof in the moving direction A is less than the length L2 thereof in the direction orthogonal to the moving direction A in plan view.

Here, as the loading members 33 on the near side in the moving direction A (the first loading members 33a) are configured to be slippery among the loading members 33 of the lift mechanism 30, the tray T can therefore easily be prevented from tumbling even when the tray T is short in the moving direction A in plan view and tends to tumbles in the moving direction A.

(4-3)

In the stretch packaging machine 1 according to the embodiment described above, the lift mechanism 30 has support bars 32 as examples of support members for supporting the loading members 33. The loading members 33 are configured so as to be detachable from the support bars 32.

Here, as the loading members 33 are configured so as to be detachable from the support bars 32, loading members 33 having different frictional coefficients (first loading members 33a and second loading members 33b) can therefore be arranged as appropriate for the tray T. The tray T can therefore easily be prevented from tumbling.

(5) Modifications

Modifications of the embodiment described above will next be described. A plurality of the modifications described below may be combined insofar as the modifications are not inconsistent with each other.

(5-1) Modification A

The configuration of the tray movement mechanism 2b of the embodiment described above is given by way of example, and does not limit the present invention. It is possible to apply a variety of configurations to a tray movement mechanism in which a tray T can be moved from the weighing/carry-in mechanism 2 onto the loading members 33 of the lift mechanism 30 so as to slide over the loading members 33. For example, a configuration may be adopted in which the tray movement mechanism has a plurality of carry-in belts extended between a pair of rollers, and the tray T is moved by projections for conveyance provided to the carry-in belts.

(5-2) Modification B

The shape, placement, quantity, and other attributes of the loading members 33 of the embodiment described above are given by way of example, and do not limit the present invention. For example, the loading members 33 may be circular or ellipsoidal in plan view. Instead of seven loading members 33 being disposed in each of five rows in the moving direction A of the tray T as illustrated in FIG. 5, an appropriate quantity of loading members 33 may be disposed in an appropriate orientation at appropriate positions, such as ten loading members 33 in each of four rows, for example.

(5-3) Modification C

The arrangement of the first loading members 33a and second loading members 33b in the embodiment described above is given by way of example, and does not limit the present invention. For example, in the loading members 33, the two rows on the front side (near side in the moving direction A of the tray T) are configured as first loading members 33a, and the three rows on the rear side (far side in the moving direction A of the tray T) are configured as second loading members 33b in the embodiment described above. However, a configuration may be adopted in which one row on the front side is configured as first loading members 33a and four rows on the rear side are configured as second loading members 33b.

(5-4) Modification D

In the embodiment described above, the frictional coefficients of portions of contact between the first loading members 33a and the tray T and of portions of contact between the second loading members 33b and the tray T are kept different from each other by using different materials therein, but this configuration does not limit the present invention. For example, a configuration may be adopted in which the same material is used in the portions of the first loading members 33a and second loading members 33b that contact the tray T, but the frictional coefficients of the portions of contact between the first loading members 33a and the tray T and the portions of contact between the second loading members 33b and the tray T may be kept different from each other by the presence or absence of surface processing or by changing the surface roughness or the like.

(5-5) Modification E

The embodiment described above is an example of an application of the present invention to a transverse-film-feed-type stretch packaging machine; however, the present invention is not limited to this application. The feed direction of the film is not particularly limited, and the present invention is also applicable to a longitudinal-film-feed-type stretch packaging device.

(5-6) Modification F

The conveyance member 2bb engages with the carry-in belts 2ba and is driven by the carry-in belts 2ba in the tray movement mechanism 2b of the weighing/carry-in mechanism 2 in the embodiment described above, but this configuration does not limit the present invention. A conveyance chain, for example, may be used instead of the carry-in belts 2ba in order to drive the tray movement mechanism 2b.

(5-7) Modification G

The loading members 33 are configured so as to be detachable from the support bars 32 in the embodiment described above, but this configuration does not limit the present invention. For example, the loading members 33 may be configured so as to be detachable integrally with the support bars 32 from the support base 31, which is an example of a supporting member for supporting the loading members 33.

INDUSTRIAL APPLICABILITY

The present invention is useful as a stretch packaging machine in which a container having an opening on top is slidingly moved over loading members onto a lift mechanism having a plurality of loading members and the container can easily be prevented from tumbling while being moved onto the lift mechanism.

What is claimed is:

1. A stretch packaging machine comprising:
a lift mechanism having a plurality of loading members on which a container is loaded, the container having an opening at a top surface thereof, the lift mechanism being configured to lift up the container on the loading members toward a film such that the container can contact the film closing or sealing the opening; and
a container movement mechanism configured to slidingly move the container in a moving direction over the loading members of the lift mechanism to a predetermined position on the loading members,
wherein the loading members include a first group of loading members and a second group of loading members, the first group of loading members being disposed on an upstream side relative to the moving direction and being configured to contact the container, the second group of loading members being disposed on a downstream side relative to the moving direction, a frictional coefficient of the first group of loading members is smaller than a frictional coefficient of the second group of loading members.

2. The stretch packaging machine according to claim 1, wherein
a length of the container measured in the moving direction is less than a length thereof in a direction orthogonal to the moving direction.

3. The stretch packaging machine according to claim 2, wherein
the lift mechanism further has a support member for supporting the loading members; and
the loading members are configured so as to be detachable from the support members.

4. The stretch packaging machine according to claim 1, wherein
the lift mechanism further has a support member for supporting the loading members; and
the loading members are configured so as to be detachable from the support members.

* * * * *